(12) United States Patent
Sumner et al.

(10) Patent No.: US 9,092,903 B2
(45) Date of Patent: Jul. 28, 2015

(54) METABRUSHES FOR DIGITAL PAINTING

(71) Applicant: Disney Enterprises, Inc., Burbank, CA (US)

(72) Inventors: Robert Sumner, Zurich (CH); Marie-Paule Cani, Montbonnot (FR); Stelian Coros, Zurich (CH); Antoine Milliez, Zurich (CH); Ilya Baran, Cambridge, MA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 91 days.

(21) Appl. No.: 13/797,823

(22) Filed: Mar. 12, 2013

(65) Prior Publication Data

US 2014/0267223 A1    Sep. 18, 2014

(51) Int. Cl.
*G06T 11/20* (2006.01)
*G06T 19/20* (2011.01)

(52) U.S. Cl.
CPC ......... *G06T 19/20* (2013.01); *G06T 2219/2012* (2013.01); *G06T 2219/2024* (2013.01)

(58) Field of Classification Search
USPC ................................. 345/440, 441
See application file for complete search history.

(56) References Cited

U.S. PATENT DOCUMENTS

| | | | |
|---|---|---|---|
| 5,182,548 A * | 1/1993 | Haeberli ................ | 345/639 |
| 6,226,000 B1 * | 5/2001 | Richens et al. .......... | 345/419 |
| 6,268,865 B1 * | 7/2001 | Daniels et al. .......... | 345/582 |
| 6,348,924 B1 * | 2/2002 | Brinsmead .............. | 345/441 |
| 6,373,490 B1 * | 4/2002 | Bendiksen et al. ...... | 345/441 |
| 6,970,169 B1 * | 11/2005 | Harris ..................... | 345/440 |
| 7,236,178 B2 | 6/2007 | Maillot et al. | |
| 7,446,778 B2 | 11/2008 | Maillot et al. | |
| 7,602,405 B2 * | 10/2009 | Hsu ........................ | 345/629 |
| 7,728,843 B2 * | 6/2010 | Maillot et al. .......... | 345/582 |
| 8,018,470 B2 * | 9/2011 | Hsu ........................ | 345/619 |
| 8,081,187 B2 * | 12/2011 | Perani et al. ............ | 345/441 |
| 2007/0216684 A1 * | 9/2007 | Hsu ........................ | 345/441 |
| 2008/0278514 A1 * | 11/2008 | Maillot et al. .......... | 345/582 |
| 2013/0120436 A1 * | 5/2013 | Krishnaswamy et al. ... | 345/594 |
| 2013/0229390 A1 * | 9/2013 | DiVerdi ................... | 345/179 |

OTHER PUBLICATIONS

Siu Chi Hsu and Irene H. H. Lee. Drawing and animation using skeletal strokes. In Proceedings of the 21st annual conference on Computer graphics and interactive techniques, SIGGRAPH '94, pp. 109-118, New York, NY, USA, 1994. ACM.

Daniel Keefe, Daniel Acevedo, Tomer Moscovich, David H. Laidlaw, and Joseph LaViola. Cavepainting: A fully immersive 3D artistic medium and interactive experience. In Proceedings of ACM Symposium on Interactive 3D Graphics, pp. 85-93, Mar. 2001.

(Continued)

*Primary Examiner* — M Good Johnson
(74) *Attorney, Agent, or Firm* — Sheppard Mullin Richter & Hampton LLP

(57) ABSTRACT

Metabrushes for digital painting (such as 3D painting) are provided. Metabrushes may be defined by 3D paint strokes embedded on an elementary piece of geometry. Paint strokes are replicated in 3D over a user's painting gesture, allowing a fast embedding of numerous strokes using only a few user input gestures. Hierarchical metabrushes are further provided for providing faster and more diverse creation of digital paintings.

20 Claims, 11 Drawing Sheets
(8 of 11 Drawing Sheet(s) Filed in Color)

(56) References Cited

OTHER PUBLICATIONS

Rubaiat Habib Kazi, Takeo Igarashi, Shengdong Zhao, and Richard Davis. Vignette: interactive texture design and manipulation with freeform gestures for pen-and-ink illustration. In Proceedings of the 2012 ACM annual conference on Human Factors in Computing Systems, CHI '12, pp. 1727-1736, New York, NY, USA, 2012. ACM.
George Katanics and Tasso Lappas. Deep Canvas: Integrating 3D Painting and Painterly Rendering. In Mario Costa Sousa, editor, Theory and Practice of Non-Photorealistic Graphics: Algorithms, Methods, and Production Systems, vol. 10 of ACM SIGGRAPH 2003 Course Notes, chapter 10. ACM SIGGRAPH, New York, 2003.
Robert D. Kalnins, Lee Markosian, Barbara J. Meier, Michael A. Kowalski, Joseph C. Lee, Philip L. Davidson, Matthew Webb, John F. Hughes, and Adam Finkelstein. WYSIWYC NPR: Drawing strokes directly on 3D models. ACM Transactions on Graphics (Proc. SIGGRAPH), 21(3):755-762, Jul. 2002.
Tae-Yong Kim and Ulrich Neumann. Interactive multiresolution hair modeling and editing. ACM Trans. Graph., 21 (3):620-629, Jul. 2002.
Peter Litwinowicz. Processing images and video for an impressionist effect. In Proceedings of the 24th annual conference on Computer graphics and interactive techniques, SIGGRAPH '97, pp. 407-414, New York, NY, USA, 1997. ACM Press/Addison-Wesley Publishing Co.
Lee Markosian, Barbara J. Meier, Michael A. Kowalski, Loring Holden, J. D. Northrup, and John F. Hughes. Art-based rendering with continuous levels of detail. In NPAR, pp. 59-66, 2000.
Uri Shani and Dana H. Ballard. Splines as embeddings for generalized cylinders. Computer Vision, Graphics, and Image Image Processing, 27(2):129-156, 1984.
Cyril Soler, Marie-Paule Cani, and Alexis Angelidis. Hierarchical pattern mapping. In Proceedings of the 29th annual conference on Computer graphics and interactive techniques, SIGGRAPH '02, pp. 673-680, New York, NY, USA, 2002. ACM.
Donald Shepard. A two-dimensional interpolation function for irregularly-spaced data. In Proceedings of the 1968 23rd ACM national conference, ACM '68, pp. 517-524, New York, NY, USA, 1968. ACM.
Steven Schkolne, Michael Pruett, and Peter Schr•oder. Surface drawing: creating organic 3d shapes with the hand and tangible tools. In Proceedings of the SIGCHI conference on Human factors in computing systems, CHI '01, pp. 261-268, New York, NY, USA, 2001. ACM.
Johannes Schmid, Martin Sebastian Senn, Markus Gross, and Robert W. Sumner. Overcoat: an implicit canvas for 3d painting. ACM Trans. Graph., 30:28:1-28:10, Aug. 2011.
Michael P. Salisbury, Michael T.Wong, John F. Hughes, and David H. Salesin. Orientable textures for image-based pen-and-ink illustration. In Proceedings of the 24th annual conference on Computer graphics and interactive techniques, SIGGRAPH '97, pp. 401-406, New York, NY, USA, 1997. ACM Press/Addison-Wesley Publishing Co.
Daniel Teece. Animating with expressive 3d brush strokes (animation abstract). In Proceedings of the 1st international symposium on Non-photorealistic animation and rendering, NPAR'00, p. 113, New York, NY, USA, 2000. ACM.
WenpingWang, Bert J•uttler, Dayue Zheng, and Yang Liu. Computation of rotation minimizing frames. ACM Trans. Graph., 27(1):2:1-2:18, Mar. 2008.
Li-Yi Wei and Marc Levoy. Fast texture synthesis using tree-structured vector quantization. In Proceedings of the 27th annual conference on Computer graphics and interactive techniques, SIGGRAPH '00, pp. 479-488, New York, NY, USA, 2000. ACM Press/Addison-Wesley Publishing Co.

\* cited by examiner

METABRUSHES FOR DIGITAL PAINTING

TECHNICAL FIELD

The present application relates generally to computer graphics, more particularly, some embodiments relate to proxy-based digital painting.

DESCRIPTION OF THE RELATED ART

Modern digital painting software emulates the traditional painting metaphor while further empowering the user with control over layering, compositing, filtering, and other effects. As a result, artists have an extremely powerful, flexible, and expressive tool set for creating 2D digital paintings.

Most attempts to bring digital painting into the third dimension (3D) focus on texture painting or methods that project stroke centerlines onto an object's surface. The strokes must precisely conform to the object's surface, and the mathematical nature of these algorithms can betray the underlying 3D structure of the scene, leading to a "gift-wrapped" appearance. Stylistic effects that require off-surface brush strokes are not easily realized. Indistinct structures such as fur, hair, or smoke must be addressed using special-purpose modeling software without the direct control afforded by painting. These limitations ultimately restrict the variety of possible 3D digital painting styles and may hinder the artist's ability to realize their creative visions.

BRIEF SUMMARY OF THE APPLICATION

According to various embodiments of the application, metabrushes for digital (such as 3D) painting are provided. A metabrush comprises paint strokes. When painting with a metabrush, the paint strokes of the metabrush are used as a template, replicated and instantiated along the brush path. In various embodiments, noise may be applied to each metabrush instance when the metabrush instance is instantiated. The noise may comprise geometry jittering, color jittering, opacity jittering, or any combination thereof. A metabrush may further comprise proxy geometry that may be inserted into a scene, which enables painting objects without modeling their geometries.

Hierarchical metabrushes are also provided. A higher-level hierarchical metabrush may be based on a lower-level metabrush and comprise paint strokes that are constituents of the lower-level metabrush. Different noise models may be applied to various levels of hierarchical metabrushes when painting with hierarchical metabrushes.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

Figure 1:
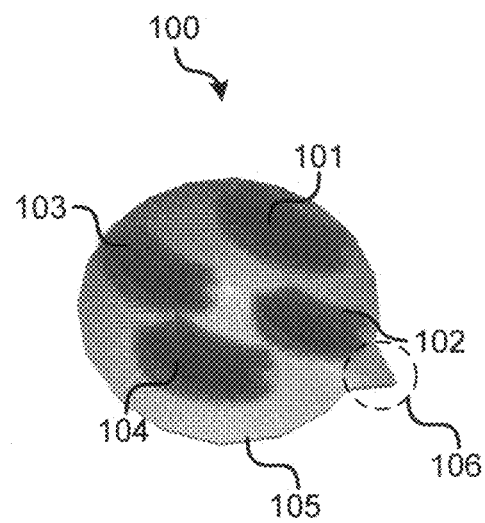
FIG. 1 illustrates an exemplary metabrush.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION 3D digital paintings may be created by embedding paint strokes in 3D spaces with the aid of basic proxy geometry. Conventional 3D paintings can be tedious and time-consuming as many repetitive paint strokes are required for painting. By enabling the use of a single painting gesture to add a multitude of self-similar details, and even to create new geometry parts carrying details, proxy-based 3D painting is made easier and faster. A user (for example, an artist) will be able to concentrate on the specific regions where his input is essential, rather than losing time painting self-similar details one by one.

The present application is directed toward proxy-based digital (such as 3D) painting with metabrushes. Various embodiments provide metabrushes for digital (such as 3D) painting. A metabrush comprises a plurality of constituent paint strokes. A constituent paint stroke may be used as a template. Metabrush instances may be instantiated based on the template. When painting with a metabrush, metabrush instances are instantiated along the brush path. In various embodiments, noise may be applied to each metabrush instance when the metabrush instance is instantiated. The noise may comprise geometry jittering, color jittering, opacity jittering, or any combination thereof. A metabrush may further comprise proxy geometry that may be inserted into a scene, which provides painting objects without modeling its geometry.

A metabrush may be defined by a piece of elementary geometry on which constituent paint strokes are embedded. When painting with a metabrush, a metabrush stroke is sampled in world space and coordinate frames are defined along the metabrush stroke to place constituent paint strokes into the 3D canvas. In various embodiments, the plurality of constituent strokes included in the metabrush are embedded in the 3D canvas when the metabrush is used to instantiate metabrush instances along the brush path. The metabrush comprising the paint strokes may be replicated on the sample positions and a scale of a metabrush may be computed in world space for scaling the metabrush in 3D. In one embodiment, a coordinate frame on each of the sampled positions is defined and used to replicate the metabrush.

Hierarchical metabrushes are also provided. A higher-level hierarchical metabrush may be based on a lower-level metabrush and comprise paint strokes that are included in the lower-level metabrush. When using hierarchical metabrushes, the process of painting with a metabrush is repeated as many passes as there are levels in the hierarchy. The lower-level metabrush strokes included in higher level metabrushes are replicated in 3D space, and then sampled in world space. The lower-level metabrushes may be scaled by using a coordinate frame. The noise parameters are also transmitted through the hierarchy. Noise (for example, color jittering, and/or geometry jittering) may be applied at various hierarchical levels and combined together. Different noise models may be applied to various levels of hierarchical metabrushes.

FIG. 1 illustrates an exemplary metabrush 100. A metabrush is defined in 3D and may be defined by a piece of elementary geometry on which paint strokes are embedded. The elementary geometry is a proxy geometry that may be inserted into a scene when the metabrush is used for painting. The proxy geometry is the base mesh on which a user paints. In one embodiment, a flat or a cylinder elementary metabrush proxy meshes may be selected for defining a metabrush. The illustrated metabrush 100 is defined on the elementary geometry 105 and comprises constituent paint strokes 101-104. When painting with the metabrush 100, the elementary geometry 105 may be inserted into a scene. The arrow 106 of the metabrush 100 illustrates the painting direction of the metabrush 100. Matching this direction to the direction of the user's painting gesture may define a coordinate frame for replicating the metabrush 100.

The metabrush 100 and metabrush instances instantiated may be edited and customized. A user may define and customize each constituent paint stroke 101-104, the metabrush 100, and any metabrush instance instantiated. For example, in one embodiment, a collection of metabrushes may be provided to a user. The user may select a metabrush from the collection of metabrushes for painting. The user may edit the metabrush 100 before generating a metabrush instance, or the user may generate a metabrush instance and edit the metabrush instance. In some embodiments, the metabrush 100 or a metabrush instance may be edited during painting, and the edits or the changes to the metabrush 100 or the metabrush instance may be populated to all metabrush instances 100 including the metabrush instances that have been created.

Figure 2:
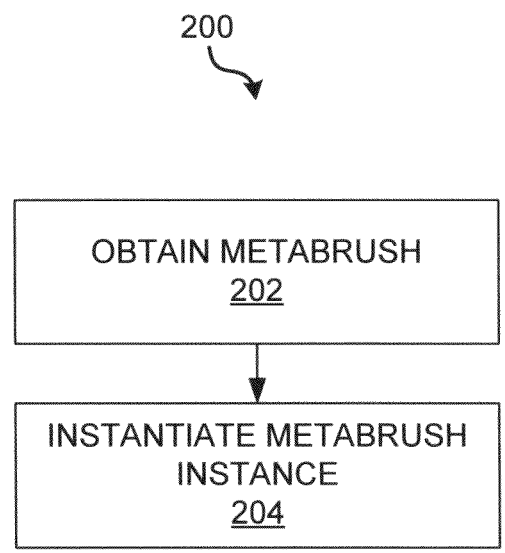
FIG. 2 is a flow diagram illustrating an exemplary method of painting with metabrushes, such as the metabrush illustrated in FIG. 1.

FIG. 2 is a flow diagram illustrating an exemplary method 200 of painting with metabrushes, such as the metabrush 100 illustrated in FIG. 1. At step 202, a metabrush is obtained. The metabrush may comprise a plurality of constituent paint strokes. The metabrush may be based on elementary metabrush proxy meshes that may be flat or cylinder. In some embodiments, the elementary metabrush proxy meshes may be in other geometry shapes such as cubical. The proxy geometry is the base mesh on which a user paints. The proxy geometry may be a triangle mesh, which may form a closed manifold solid. A scalar field f: $\mathbb{R}^2 \to \mathbb{R}$ may be defined, that maps each point in space to a scalar value. A plurality of levels may be defined and each level may define a level set $f(x)=l$ on which to paint. The scalar value may correspond to a point's signed Euclidean distance to the proxy geometry shape. Accordingly, the equation $f(x)=0$ defines an implicit surface, corresponding to the points of the proxy geometry surface. This implicit surface is the level set of level 0. A point x such that $f(x)<0$ lies inside the proxy geometry surface, and a point x such that $f(x)>0$ lies outside the proxy geometry surface.

In various embodiments, the plurality of constituent paint strokes may be painted in screen space. In some embodiments, a metabrush may be selected from a collection of existing metabrushes. In one embodiment, a thumbnail or a picture of the metabrush may be provided. In some embodiments, a metabrush may be edited. In further embodiments, a new metabrush may be created and obtained.

At step 204, the obtained metabrush is instantiated along a brush path. During painting, a user's gesture describes a stroke which is placed into the 3D canvas. The stroke is sampled in world space to define positions where metabrush instances can be instantiated. The stroke points $(p_i)_i$ are placed somewhere along the view ray going through the screen space points. $p_i = o + t_i d_i$, where o is the camera position at painting time, $d_i$ is the view vector passing through the screen space position, and $t_i$ is the ray parameter. Accordingly, a stroke can be projected back from the world space to the screen positions defined by the user's gesture.

The plurality of constituent paint strokes may be replicated along the brush path. In various embodiments, the plurality of constituent paint strokes included in the metabrush are embedded in the 3D canvas when the metabrush is used to instantiate metabrush instances along the brush path. Each metabrush instance may be a replication of the metabrush. That is, each metabrush instance comprises the constituent paint strokes included in the metabrush. The geometry of each metabrush instance replicates the proxy geometry of the metabrush. In some embodiments, a skeletal stroke is defined in the painting direction by placing the 2D painting gesture in the 3D space, and is sampled in world space and used as a support for scaling the metabrush and generating metabrush instances. The constituent paint strokes and the proxy geometry of a metabrush may be replicated by using samples of the skeletal stroke. The skeletal stroke of the embedded strokes may be sampled in world space. The replicated constituent strokes and geometry of a metabrush (i.e., the replication of the metabrush) may be added to a scene.

In some embodiments, a metabrush may comprise proxy geometry that may be inserted into a scene. The metabrush proxy geometry allows painting objects without modeling their geometry. In further embodiments, a metabrush may comprise different sub-templates defined for various portions of a constituent paint stroke. In one embodiment, a metabrush comprises sub-templates defined for the beginning, the middle, and the end portions of a constituent paint stroke. As such, an object may be created in one metabrush stroke. For example, a snake with a head and a tail may be painted in a single metabrush stroke using a metabrush.

In further embodiments, semantic information may be used to determine the appropriate metabrush to use for painting in a scene. In one embodiment, a metabrush may comprise a semantic model to determine when the metabrush should be used. The semantic model may comprise semantic information describing a set of scenes appropriate for using the metabrush. For example, when painting a metabrush stroke that attaches to a shoulder, a semantic model included in a metabrush for drawing arms would determine that the metabrush is appropriate for use. The semantic model may compare the painting scene to the set of scenes in which that the metabrush is appropriate to use. In one embodiment, a Markov model may be defined for determining the appropriate metabrush.

In various embodiments, an optimization in finding the values of $(t_i)_i$ minimizing the weighted sum of a level distance objective term $E_{level}$, an angle objective term $E_{angle}$, and an arc length objective term $E_{length}$ may be used to find the space position of a stroke. The optimization process optimize E as defined in Equation (1):

$$E = \omega_{level} E_{level} + \omega_{angle} E_{angle} + \omega_{length} E_{length} \quad (1)$$

where $\omega_{level}$ is the weight for the level distance objective term $E_{level}$, $\omega_{angle}$ is the weight for the angle objective term $E_{angle}$, and $\omega_{length}$ is the weight for the arc length objective term $E_{length}$. In various embodiments, a skeletal stroke for metabrush replication may be defined by this optimization process.

During painting, a level l that defines a level set f(x)=1 on which to paint may be determined. In various embodiments, the embedding process ensures that the 3D stroke is as close as possible to each level set. The level distance objective term may be defined as $$E_{level} = \sum_{i=1}^{n} (f(p_i) - l)^2.$$

In one embodiment, a stroke may be embedded as close as possible to a level set. Accordingly, the level weight is given a dominant value.

In various embodiments, a directional deviation between consecutive 3D line segments is minimized in order to define a smooth line. An angle objective term is the cross product between consecutive line vectors. The angle objective term $$E_{angle} = \sum_{i=1}^{n-1} \left(1 - \frac{p_{i+2} - p_{i+1}}{\|p_{i+2} - p_{i+1}\|} \cdot \frac{p_{i+1} - p_i}{\|p_{i+1} - p_i\|}\right)^2$$

may be minimized in order to define a smooth line. Some embodiments may provide painting across level sets by specifying a starting level and an ending level. In one embodiment, the first point and the last point of the stroke are constrained to lie on the starting level and the ending level using $\omega_{level}=1$, respectively. The remaining points are not constrained to any level and use $\omega_{level}=0$, which allows the points to be placed into any level. In one embodiment, $\omega_{angle}=1$ may be used to ensure that the points are embedded on levels that produce a smooth stroke. In another embodiment, by using $\omega_{length}=0.05$, constraining the level optimization term alone may produce strokes that overshoot the target level to minimize the angel deviation.

In one embodiment, strokes may start in a close to tangential way to the surface by adding a virtual point $p_0$ in a direction tangential to the scalar field and with the largest angle to the line connecting $p_1$ and $p_n$. As such, strokes may be embedded by using a temporary prepended point to have a first vector close to tangent to the level set.

The arc length objective term $$E_{angle} = \sum_{i=1}^{n-1} \|p_{i+1} - p_i\|^2$$

is provided to penalize the total length of the 3D stroke. The embedded strokes may start in a close to orthogonal way to a level set by prepending a temporary point $p_0$ to the stroke and placing it along the negative gradient direction. As such, strokes may be embedded that start substantially orthogonally to the level set.

Figure 3:
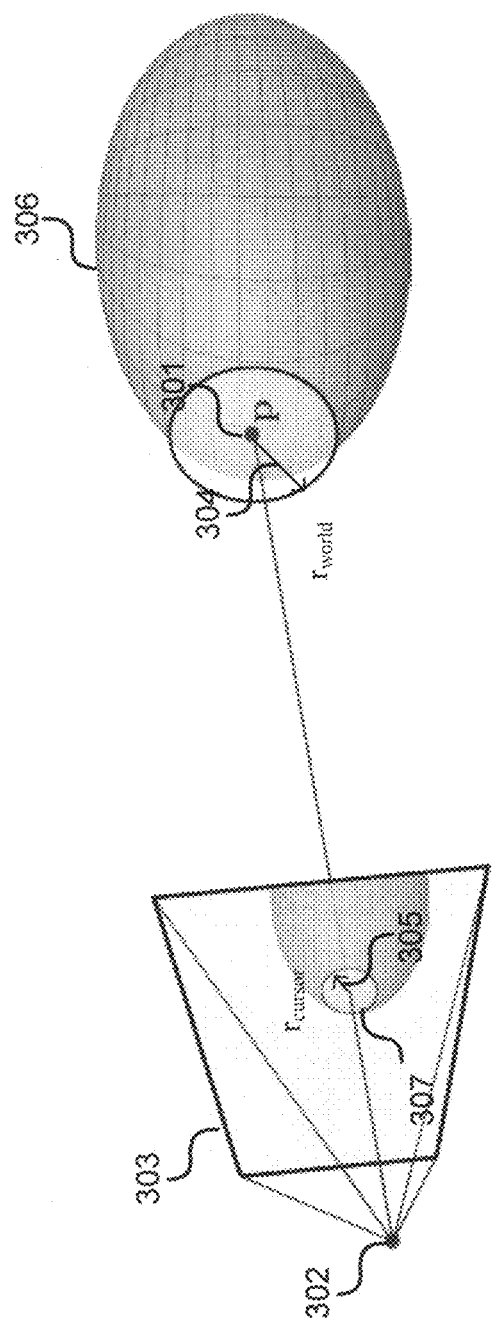
FIG. 3 illustrates computing a metabrush scale, such as for the exemplary method, illustrated in FIG. 2, of painting with a metabrush.

FIG. 3 illustrates computing a metabrush scale, such as for the exemplary method 200, illustrated in FIG. 2, of painting with a metabrush. In various embodiments, metabrushes may be scaled in 3D when embedded. The scale of a metabrush may be computed in world space 306 for scaling the metabrush in 3D. As illustrated, in one embodiment, the first point p 301 of a metabrush stroke may be used. The disk-shaped painting cursor 307 may be projected from the screen onto a plane parallel to the camera screen 303, passing through the first point p 301. The metabrush scale may be computed from the metabrush radius 304, defined by the radius $r_{world}$, the cursor radius 305 $r_{cursor}$, and the camera characteristics such as the proportions of the camera screen 303, the distance from the camera center 302 to the center of the camera screen 303, the 3D positions of the center of the painting cursor 307 and of the first point 301 being projected.

Figure 4:
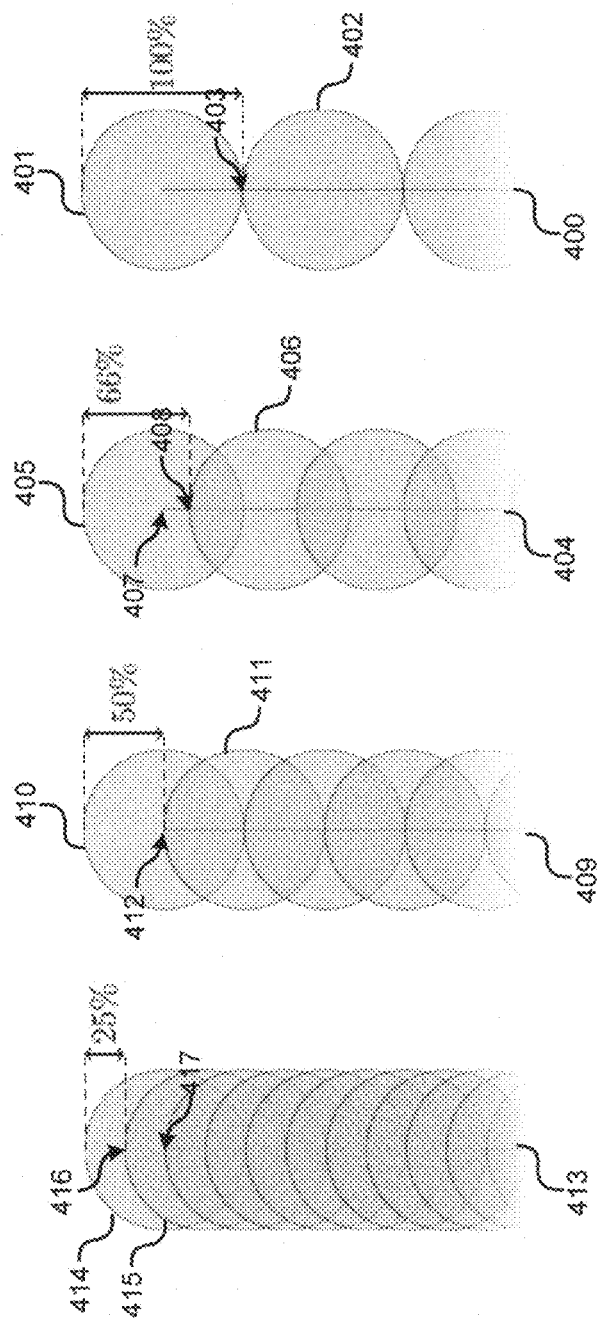
FIG. 4 illustrates sampling a metabrush, such as for the exemplary method, illustrated in FIG. 2, of painting with a metabrush.

FIG. 4 illustrates sampling a metabrush, such as for the exemplary method 200, illustrated in FIG. 2, of painting with a metabrush. In various embodiments, a skeletal stroke may be defined by placing the 2D painting gesture into a 3D canvas and may be sampled in world space. In various embodiments, a percentage parameter may be used to control the spacing between two adjacent samples (i.e., a metabrush instance). The percentage parameter denotes the non-overlapping degree of two adjacent metabrush instances along the metabrush stroke or the brush path. For example, as illustrated in FIG. 4, a spacing parameter 100% causes two adjacent metabrush instances 401 and 402 disposed side by side along the metabrush stroke 400. The metabrush instances 401 and 402 are not overlapped. The point 403 is both the last point of the metabrush instance 401 and the first point of the metabrush instance 402. The space parameter 100% may be used in applications that metabrushes should be disjointed, such as squares of a checkboard or leopard patches.

A spacing parameter 66% causes two adjacent metabrush instances 405 and 406 disposed such that the metabrush instances 405 and 406 have an overlapping area of 34% along the metabrush stroke 404. The metabrush 406 starts at a point 408 that is one-third of radius from the center 407 of the metabrush instance 405. A spacing parameter 50% causes two adjacent metabrush instances 410 and 411 disposed such that the metabrush instances 410 and 411 have an overlapping area of 50% along the metabrush stroke 409. A point 412 is both the center point of the metabrush instance 410 and the starting point of the metabrush instance 411. A spacing parameter 25% causes two adjacent metabrush instances 414 and 415 disposed such that the metabrush instances 414 and 415 have an overlapping area of 75% along the metabrush stroke 413. The metabrush 415 starts at a point 416 that is half of the radius from the center 417 of the metabrush instance 414.

Figure 5B:
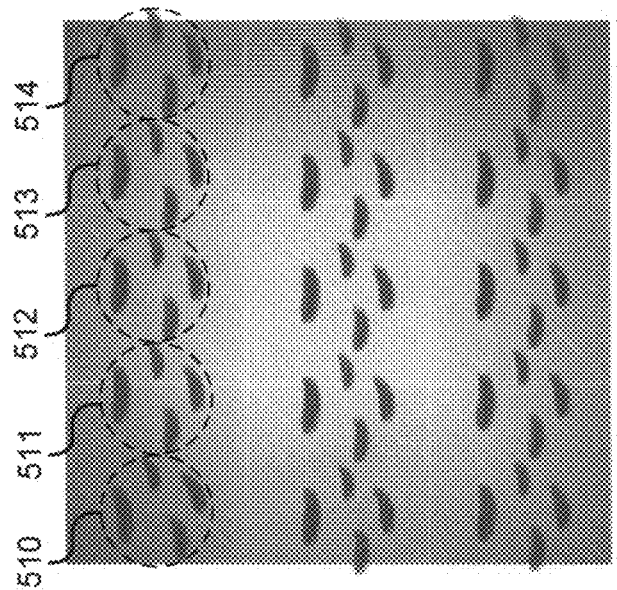
FIG. 5B illustrates rendered metabrush strokes based on the metabrush illustrated in FIG. 1 and the exemplary canvas illustrated in FIG. 5A, such as for the exemplary method, illustrated in FIG. 2, of painting with a metabrush.
Figure 5A:
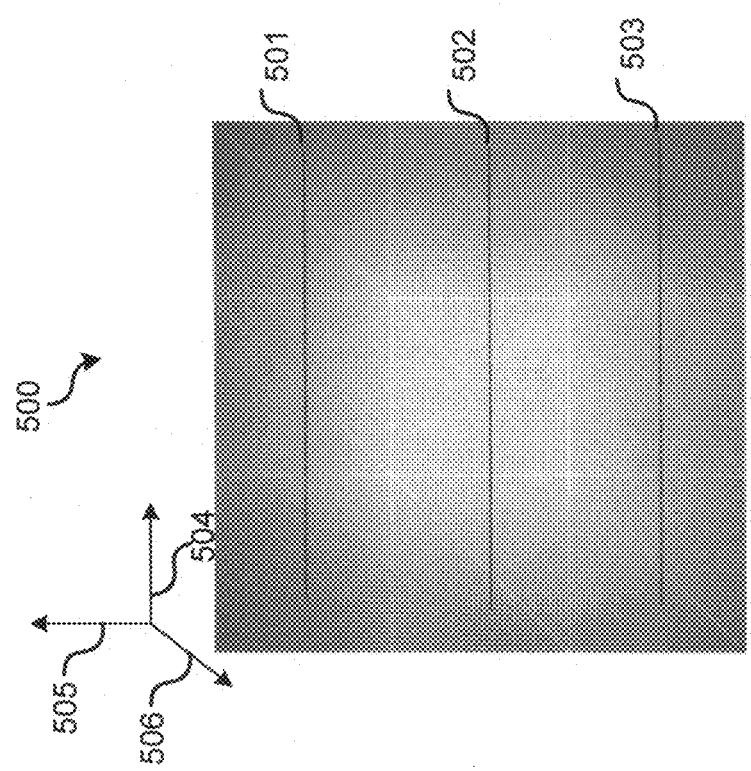
FIG. 5A illustrates an exemplary canvas for metabrush replication, such as for the exemplary method, illustrated in FIG. 2, of painting with a metabrush.

FIGS. 5A-5B illustrate replicating a metabrush 100 (illustrated in FIG. 1), such as for the exemplary method 200, illustrated in FIG. 2, of painting with a metabrush. Once a skeletal line of a metabrush is sampled, a metabrush may be replicated on the sample positions. In one embodiment, a coordinate frame on each of the sampled positions is defined and used to replicate the metabrush. FIG. 5A illustrates an exemplary canvas 500 for metabrush replication, such as for the exemplary method 200, illustrated in FIG. 2, of painting with a metabrush. In the illustrated example, the three skeletal strokes 501, 502 and 503 are painted on the same levelset and in a parallel fashion. Accordingly, all the sampled positions along those skeletal strokes 501-503 use the same coordinate frame for metabrush replication. That coordinate frame is defined by the painting direction 504, the orthogonal vector 506 to the levelset, and the third vector 505, orthogonal to 504 and 506. A painting direction relative to the metabrush geometry may be defined. In one embodiment, the painting direction may be defined when editing a metabrush. The direction may be mapped to the tangential direction of the paint stroke at the sampled position when computing the 3D coordinate frames along a paint stroke. As such, the vector 504 that describes the painting gesture may be determined.

In some embodiments, 3D coordinate frames may be defined along a curve $t \rightarrow C(t)$ and may be determined by using a rotation minimizing frame. Rotation minimizing frames may be defined by a vector tangent to a curve $t \rightarrow C(t)$, a normal vector pointing, when possible, in the curvature direction, and a third vector computed as a cross product of the vector and the normal vector. The rotation minimizing frames may be computed to define coordinate frames for the curve $t \rightarrow C(t)$. In some embodiments, an initial coordinate frame at the first sampled point of a metabrush stroke may be determined. For example, in one embodiment, a stroke may be embedded as close as possible to a level set. The gradient direction at the first point of a metabrush stroke is as orthogonal as possible to the metabrush stroke's tangential vector on that point. The gradient direction may be further projected onto the plane orthogonal to the tangential vector to ensure an orthogonal coordinate frame. The rotation minimizing coordinate frames over the whole skeletal stroke are then computed by propagating this first coordinate frame along the stroke. As illustrated in FIG. 5A, the direction 506 is computed on the first sampled point, and then propagated over the whole strokes 501-503. The straightness of the strokes 503-506 yields a uniform coordinate frame over the strokes 503-506.

In another embodiment, strokes may be embedded by using a temporary prepended point to have a first vector close to tangent to the level set. The gradient direction to the surface is close to orthogonal to the tangential stroke vector. The gradient direction may be further projected onto the plane orthogonal to the tangential vector to ensure an orthogonal coordinate frame. In a further embodiment, strokes may be embedded that start close to orthogonally to the level set. A vector tangential to the scalar field may be projected onto the plane orthogonal to the stroke's starting direction. The initial coordinate frame along the stroke may be propagated.

FIG. 5B illustrates rendered metabrush strokes based on the metabrush 100 (as illustrated in FIG. 1) and an exemplary canvas 500 (as illustrated in FIG. 5A), such as for the exemplary method 200, illustrated in FIG. 2, of painting with a metabrush. Metabrush instances based on the metabrush 100 are rendered along the metabrush strokes 501-503 on the exemplary canvas 500. For example, metabrush instances 510-514 are rendered along the metabrush stroke 501 with a space parameter of 100%.

In some embodiments, the intrinsic geometry of a metabrush may be used to define volumes around the metabrush paint strokes that come off a surface. The volume around strokes may be created by replicating the metabrush geometry alongside its strokes. The replicated geometry meshes may be considered as a separate canvas. As such, the painted strokes may be used as supports for new strokes, without other canvases interfering with the stroke's distance field. The smoothness term $\omega_{angle}$ may ensure that no such gaps will be visible on the newly embedded strokes.

FIGS. 6A-6B, 7A-7C, and 8A-8B illustrate applying various noise models, such as for the exemplary method 200, illustrated in FIG. 2, of painting with a metabrush. In various embodiments, noise models may be applied along a metabrush stroke when a metabrush is instantiated to avoid rigid and repetitive patterns that have no variations. Noise models comprises geometry jittering, opacity jittering, color jittering, and any combination thereof. Geometry jittering may comprise scale jittering, diameter jittering, or rotation jittering. Various embodiments may comprise geometrical noises. A scale, and/or rotation around the normal to the stroke for each instance of a metabrush may be randomly instantiated when a metabrush is replicated along a brush path. The amount of noise may be controlled by a user to add geometrical variety along the brush path during painting. In one embodiment, instantiated geometrical noise may be associated and saved with a scene. In further embodiments, the geometry jitters may be controlled by the pressure exerted on the input device. In some embodiments, the jittering between adjacent metabrush instances may be correlated to provide more complicated and sophisticated noise effects.

Figure 6A:
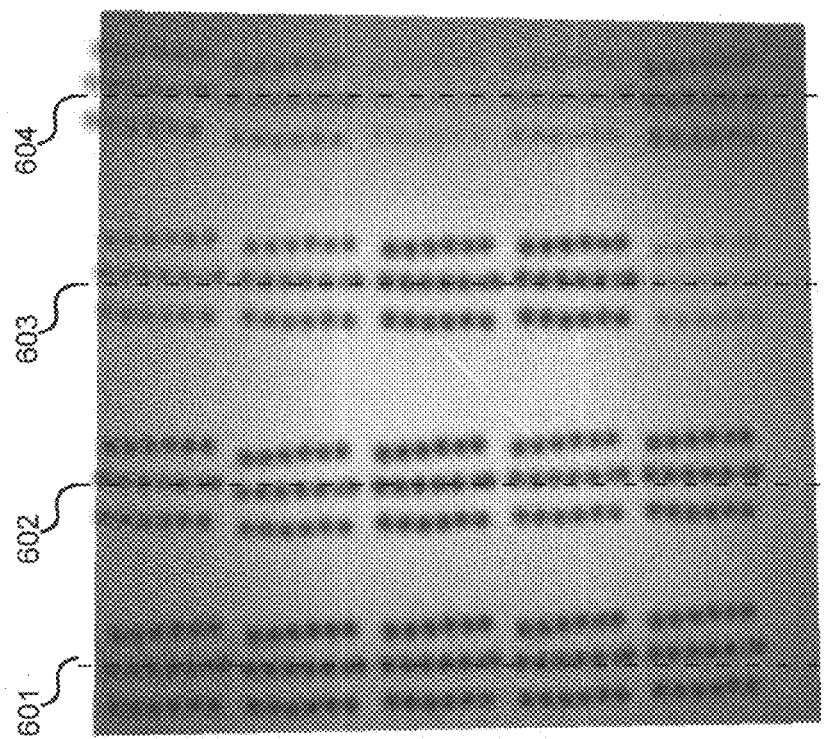
FIG. 6A illustrates applying opacity jittering to painting with the metabrush illustrated in FIG. 6B, such as for the exemplary method, illustrated in FIG. 2, of painting with a metabrush.
Figure 6B:
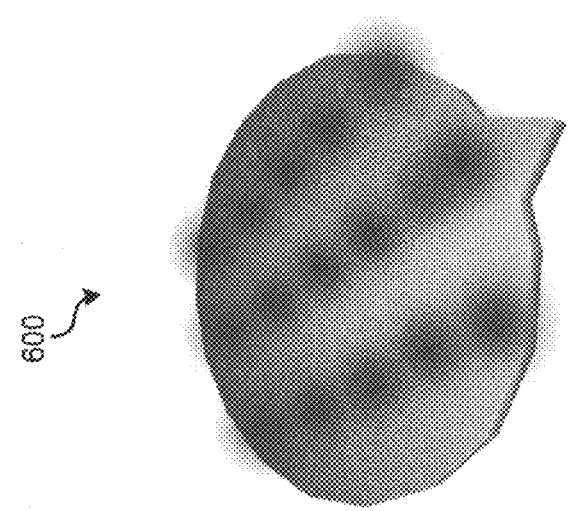
FIG. 6B illustrates an exemplary metabrush.

FIG. 6A illustrates applying opacity jittering to painting with the metabrush 600 as illustrated in FIG. 6B, such as for the exemplary method 200, illustrated in FIG. 2, of painting with a metabrush. The metabrush 600 is instantiated and replicated along the metabrush strokes 601-604. Different opacity jitter values are applied to the metabrush strokes 601-604. For example, metabrush stroke 604 has a greater jitter value than metabrush stroke 602. Accordingly, the range of possible opacities is greater in stroke 604 than stroke 602. Along each metabrush stroke, the opacity of each metabrush instance is randomly adjusted (i.e., increased or decreased) according to the corresponding opacity jittering parameter when the corresponding metabrush instance is instantiated. As such, opacity varieties are added along each metabrush stroke. The amount of opacity varieties added to the metabrush stroke is determined by the opacity jittering parameter defined and applied. In the illustrated example, opacity jitterings increase from left to right. That is, more opacity varieties are added to the metabrush strokes from left to right. Metabrush instances along the metabrush stroke 601 comprise the least amount of opacity jitter and metabrush instances along the metabrush stroke 604 comprise the most amount of opacity jitter.

Figure 7A:
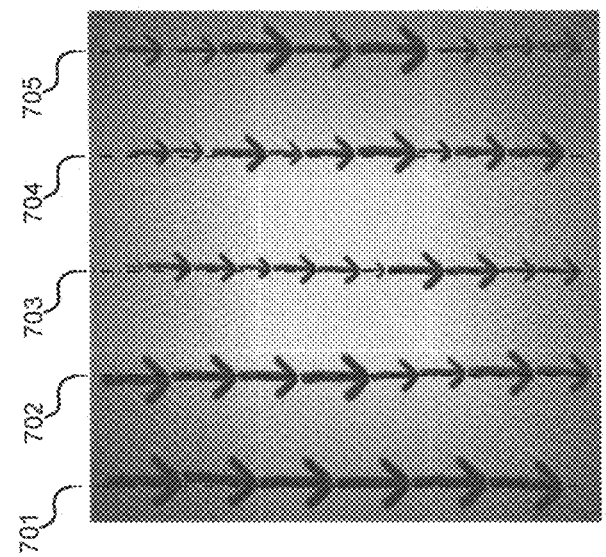
FIG. 7A illustrates applying scale jitterings to painting with a metabrush illustrated in FIG. 7C, such as for the exemplary method, illustrated in FIG. 2, of painting with a metabrush.
Figure 7B:
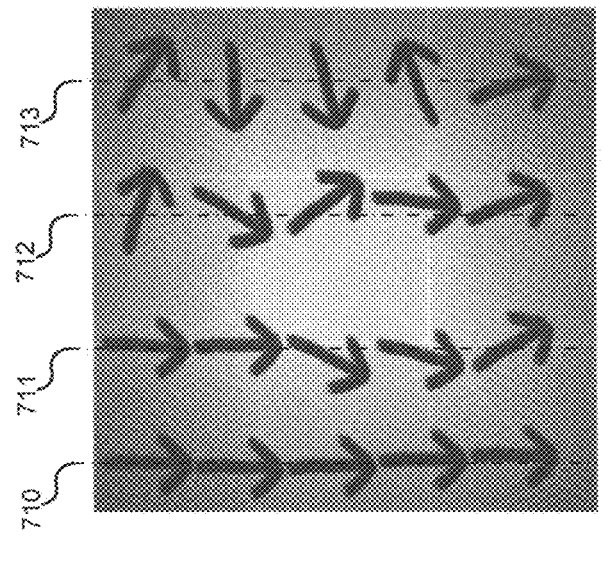
FIG. 7B illustrates applying rotation jitterings to painting with a metabrush illustrated in FIG. 7C, such as for the exemplary method, illustrated in FIG. 2, of painting with a metabrush.
Figure 7C:
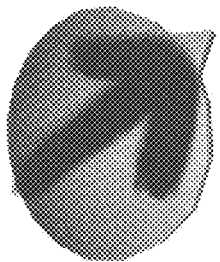
FIG. 7C illustrates an exemplary metabrush.

FIG. 7A illustrates applying scale jitterings to painting with a metabrush 700 illustrated in FIG. 7C, such as for the exemplary method 200, illustrated in FIG. 2, of painting with a metabrush. In the illustrated example, the metabrush 700 are instantiated and replicated along the metabrush strokes 701-705. In the illustrated example, the scale jittering is a diameter jittering. Different scale jitterings are applied to the metabrush strokes 701-705. Along each metabrush stroke, the diameter of each metabrush instance is randomly adjusted (i.e., increased or decreased) according to the corresponding diameter jittering parameter when the corresponding metabrush instance is instantiated. As such, scale varieties are added along each metabrush stroke. The amount of scale varieties added to the metabrush stroke is determined by the diameter jittering parameter defined and applied. In the illustrated example, diameter jitterings increase from left to right. That is, more diameter varieties are added to the metabrush strokes from left to right. Metabrush instances along the metabrush stroke 701 comprise the least amount of scale jitter and metabrush instances along the metabrush stroke 705 comprise the most amount of scale jitter.

FIG. 7B illustrates applying rotation jitterings to painting with a metabrush 700 illustrated in FIG. 7C, such as for the exemplary method 200, illustrated in FIG. 2, of painting with a metabrush. In the illustrated example, the metabrush 700 are instantiated and replicated along the metabrush strokes 710-713. Different rotation jitterings are applied to the metabrush strokes 710-713. Along each metabrush stroke, the rotation of each metabrush instance around the normal to the stroke is randomly adjusted (i.e., increased or decreased) according to the corresponding rotation jittering parameter when the corresponding metabrush instance is instantiated. As such, rotation varieties are added along each metabrush stroke. The amount of rotation varieties added to the metabrush stroke is determined by the rotation jittering parameter defined and applied. In the illustrated example, rotation jitterings increase from left to right. That is, more rotation varieties are added to the metabrush strokes from left to right. Metabrush instances along the metabrush stroke 710 comprise the least amount of rotation jitter and metabrush instances along the metabrush stroke 713 comprise the most amount of rotation jitter.

Figure 8B:
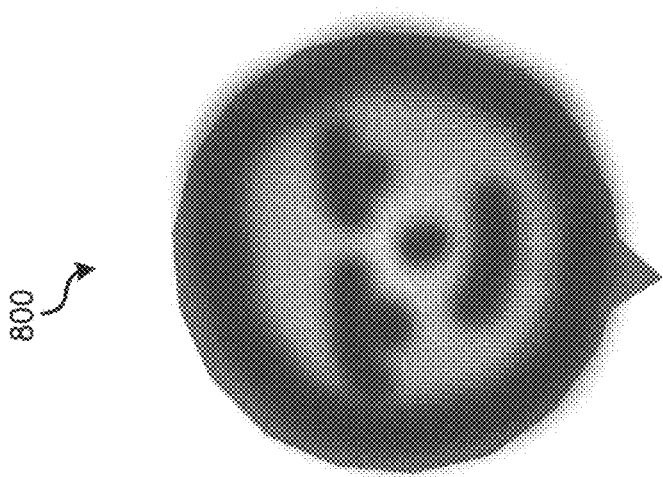
FIG. 8B illustrates an exemplary metabrush.
Figure 8A:
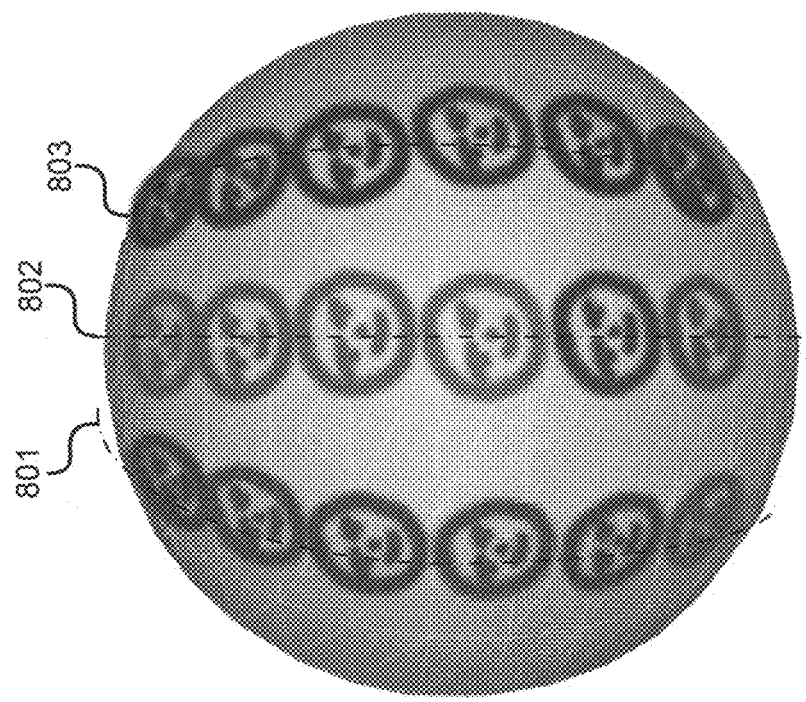
FIG. 8A illustrates applying hue, saturation, and lightness jitterings to painting with a metabrush illustrated in FIG. 8B, such as for the exemplary method, illustrated in FIG. 2, of painting with a metabrush.

In some embodiments, color noise may be applied. For example, in one embodiment, hue, saturation, and lightness for each instance of a metabrush may be randomly instantiated when a metabrush is replicated along a brush path. The amount of noise may be controlled by a user to add color variety along the brush path during painting. In one embodiment, instantiated color noise may be associated and saved with a scene. FIG. 8A illustrates applying hue, saturation, and lightness jitterings to painting with a metabrush 800 illustrated in FIG. 8B, such as for the exemplary method 200, illustrated in FIG. 2, of painting with a metabrush. In the illustrated example, hue jittering is applied to the metabrush stroke 801, saturation jittering is applied to the metabrush stroke 802, and lightness jittering is applied to the metabrush stroke 803. As such, metabrush instances along the metabrush stroke 801 comprise hue jitter, metabrush instances along the metabrush stroke 802 comprise saturation jitter, and metabrush instances along the metabrush stroke 803 comprise lightness jitter.

Figure 9C:
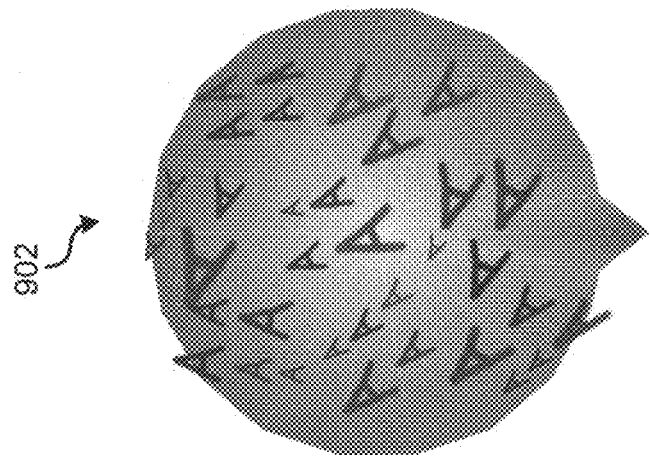
FIG. 9C illustrates an exemplary high-level metabrush based on the mid-level metabrush illustrated in FIG. 9B.
Figure 9B:
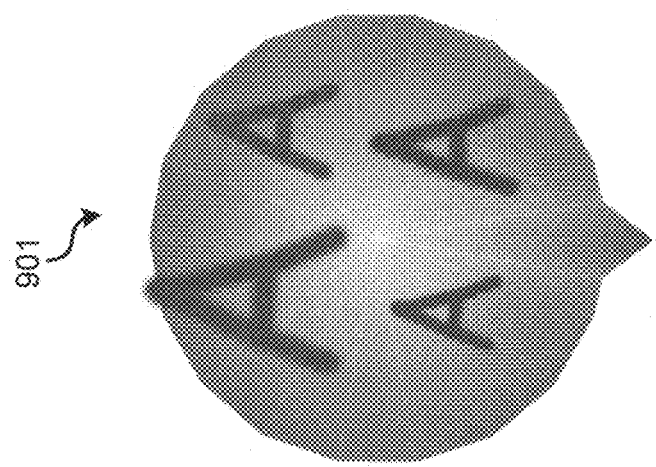
FIG. 9B illustrates an exemplary mid-level metabrush based on the low-level metabrush illustrated in FIG. 9A.
Figure 9A:
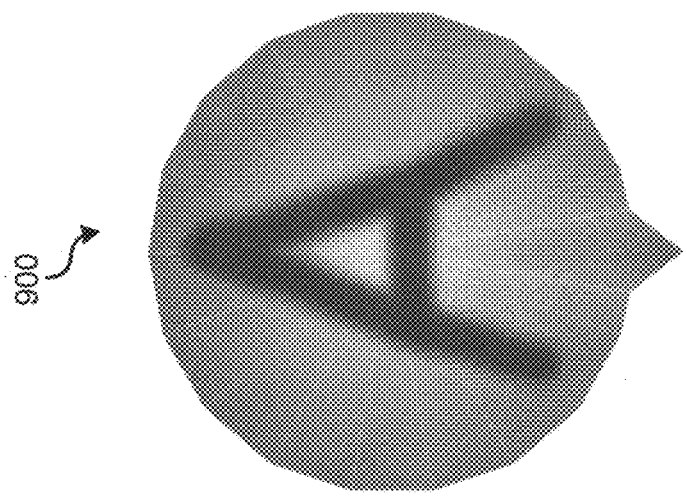
FIG. 9A illustrates an exemplary low-level metabrush.

FIGS. 9A-9C illustrate exemplary hierarchical metabrushes. A hierarchical metabrush may be defined by using existing (i.e., already-created) metabrushes. As such, hierarchical metabrushes may be defined as a metabrush stores the paint strokes therein, and a metabrush paint stroke stores the metabrush and/or the paint strokes included in the metabrush therein. The illustrated example comprise three-level hierarchical metabrushes: a low-level metabrush 900 illustrated in FIG. 9A, a mid-level metabrush 901 illustrated in FIG. 9B, and a high-level metabrush 902 illustrated in FIG. 9C. The mid-level metabrush 901 is created by using the low-level metabrush 900, and the high-level metabrush 902 is created by using the mid-level metabrush 901.

When using hierarchical metabrushes, the process of painting with a metabrush is repeated as many passes as there are levels in the hierarchy. When painting with a hierarchal metabrush, the lower-level metabrush stroke included in the hierarchal metabrush is sampled in world space and coordinate frames are defined along it. The strokes included in the metabrush are replicated in 3D using the local coordinate frames. The metabrush strokes included in metabrushes are replicated in 3D space, and then sampled in world space. The coordinate frame system scales the lower-level metabrushes, the noise parameters are also transmitted through the hierarchy. Noise (for example, color jittering, and/or geometry jittering) may be applied at various hierarchical levels and combined together. For example, diameter jittering is applied to create the mid-level metabrush 901 based on the low-level metabrush 900. Rotation jittering and color jittering are applied to create the high-level metabrush 902 based on the mid-level metabrush 901.

In one embodiment, a set of hierarchical metabrushes may apply a noise model between adjacent levels of metabrushes. The noise model may comprise a geometry jittering, a color jittering, an opacity jittering, or any combination thereof. In some embodiments, a common hierarchical metabrush is provided to allow noise to be instantiated over only a part of the metabrush. The common hierarchical metabrush groups various portions of the metabrush that are to be painted and various noise defined on separate brushes. On every instance of the hierarchical brush, the sub-metabrushes may be instantiated according to their own jittering parameters. In one embodiment, the noise model included in hierarchical metabrushes may be temporal and key-framing may be defined at various levels of the hierarchical metabrushes. The key-framing may apply to the strokes' geometry.

In some embodiments, hierarchical metabrushes may be created using metabrushes that create geometry. The hierarchical metabrushes may be used to create repetitive geometrical patterns on a mesh. In further embodiments, hierarchical metabrushes may be defined with specific pattern placements. As such, side-by-side arrangements in painting patterns may be facilitated. In further embodiments, a set of distance-based hierarchical metabrushes are provided. Depending on the distance from a reference point, various hierarchical metabrushes may comprise constituent paint strokes having different levels of details. For example, in one embodiment, at a certain distance, a hierarchical metabrush may be a primitive brush. The primitive brush may comprise less paint strokes or paint strokes having less details. As such, faster processing and more abstract rendering of far-away portions of a painting is provided.

Various embodiments provide patch-based region filling. In some embodiments, a paint stroke may be considered as a 3D point cloud comprising paint stroke points for applying point cloud synthesis. A new spatial distribution of strokes may be created and a neighborhood matching algorithm may be applied to synthesize paint strokes that keep a similar spatial arrangement as the exemplar metabrush. When applying a stroke-based synthesis, the spatial positions of new strokes may be determined.

In one embodiment, the statistical characteristics of the stroke distribution over the metabrush may be measured and used to create a new distribution of strokes. The strokes composing the metabrush may be attached to the metabrush on points that are distributed in an optimal way. For example, if the metabrush comprises n strokes as represented in Equation (2):

$$\exists R \in \mathbb{R}^+ / \forall\, i \in \{1, \ldots, n\}, \qquad (2)$$

$$\min_{j \neq i} d(BasePoint_u, BasePoint_j) = R$$

The area of the metabrush and the number of strokes included in the metabrush provides an estimation of the value of R. The irregularity of the distribution is measured as shown in Equation (3) by computing the variance defined by the sum for each stroke of the square difference between the distance to the closet stroke and the computed R value.

$$\sigma^2 = \sum_{i=1}^{n} \left( \min_{j \neq i} d(BasePoint_u, BasePoint_j) - R \right)^2 \qquad (3)$$

A new distribution of stroke positions may be created by initializing them in an optimal configuration and then applied with a displacement to produce a distribution with similar statistical characteristics as that of the metabrush. The Box-Muller formula $z=\sqrt{-2\ln(r_1)}\cos(2\pi r_2)$ may be used where $r_1$ and $r_2$ are two random variables that are uniformly distributed in [0; 1]. A normally distributed random variable z may be generated. Each stroke may be displaced by $\sigma_z$ in a random direction to obtain a stroke distribution statistically similar to the original one.

Subsequently, neighborhood matching is performed. Two neighborhoods S and T may be compared. The neighborhood S is made of m strokes, and each neighboring stroke $S_i$ is assigned a vector $$X_i = \begin{pmatrix} S_i \cdot position - S \cdot position \\ S_i \cdot color - S \cdot color \end{pmatrix}_6.$$

Such a vector fully describes the position and color of the stroke $S_i$.

A mean vector $X_s$ and a covariance matrix estimator $M_s$ may be computed over the neighborhood, as shown in Equations (4) and (5), respectively.

$$X_S = \frac{1}{m}\sum_{j=1}^{m} X_i \qquad (4)$$

$$M_S = \frac{1}{m}\sum_{i=1}^{m} (X_i - X_S)(X_i - X_S)^T \qquad (5)$$

These quantities describe a probability distribution with the density as shown in Equation (6).

$$f_{X_S}(X) = \frac{1}{(2\pi)^3 |M_S|^{1/2}} \exp\left(-\frac{1}{2}(X - X_S)^T M_S^{-1}(X - X_S)\right) \qquad (6)$$

A similarity score between S and T is computed as Equation (7).

$$\mathrm{Score}_{S,T} = \prod_{X_T \in T} F_{X_x}(X_T) \qquad (7)$$

Two point clouds S and T may be superimposed when being compared. For each point p∈T translated over S, the values of the points of S may be interpolated on the position of p. A value $p_s$ may be computed as shown in Equations (8) and (9) by using the interpolation scheme, which will be subsequently be compared to p.

$$\exists q \in S / \|q - p\| = 0 \Rightarrow p_s = \mathrm{value}(q) \qquad (8)$$

$$(\nexists q \in S / \|q - p\| = 0) \Rightarrow p_S = \sum_{\substack{s \in S \\ \|s-p\| < R_f}} \frac{1}{\|s - p\|^2} \mathrm{value}(s) \qquad (9)$$

where $R_f$ describes a falloff radius defining which strokes from S contribute to the interpolation. In one embodiment, $R_f=4R$ is used, where R is the mean distance between neighboring strokes. In various embodiments, strokes are defined by their color, thickness, length, shape, etc, and this interpolation scheme allows interpolation more than just the color.

Subsequent to matching stroke neighborhoods, the areas of the 3D canvas corresponding to the overlapping regions to small empty areas between two sets of sampled metabrushes may be filled by using this neighborhood matching method. The small nature of these areas make the algorithm sufficiently efficient. Neighborhood matching algorithms may be used to determine which color should be applied to the newly distributed strokes, by using the color of the stroke at the origin of the best-matching neighborhood from the original metabrush. Information such as the stroke's shape and thickness to the matching may be added. Accordingly, various characteristics such as the stroke's shape or thickness over the newly distributed strokes may be adjusted.

In some embodiments, color variations may be introduced at a small scale. Color modifiers may be defined on each paint stroke point. In one embodiment, at each point of the stroke, color modifiers comprise a hue modifier, a saturation modifier, and a lightness modifier. When rendering a paint stroke, the color of the corresponding parent stroke, modified by one or more color modifiers, may be applied at each point.

In various embodiments, lightness to existing strokes may be adjusted (i.e., added or removed) according to their ambient occlusion with respect to the canvas geometry. The ambient occlusion is computed on every point of the strokes, by using the gradient to the level set on that point as the normal direction, and casting rays over the semi hemisphere defined by that normal. The proportion of rays that intersect other parts of the model defines the ambient occlusion. The lightness of each point is changed accordingly. The occluded areas may be decided to be darker and/or non occluded areas brighter.

Colors may be painted on already embedded strokes. A target hue, saturation and lightness, and a hardness for the color stroke may be defined. The color strokes painted may be temporarily embedded on the mesh, and colors of the points on already embedded strokes that are within a radius defined by the color stroke may be changed according to the target hue, saturation and lightness. Saturation and lightness may be stored at each point as multiplicative factors that may be applied to the base stroke's color at render time. In one embodiment, interpolation between the already embedded strokes' hue and the target hue defined may be performed along the shortest path between two hues. In another embodiment, a hue may be configured to comprise two values, s, describing the proportion of the source hue to be used, and t, the target hue.

An operation HI(hue1, hue2, s) may be defined to perform interpolation between the hues. HI(hue1, hue2, s)=s·hue1+(1−s)·hue2, along the shortest path between hue1 and hue2. When rendering a point on a paint stroke, the rendered hue is described by hue(point)=HI(hue(stroke), t, s), where s and t are the hue modifiers. When applying a hue modifying stroke, the hue stroke's target hue t' and its hardness h. The hue stroke's action may be described by equations (10) and (11):

$$t \leftarrow HI\left(t, t', \frac{1-s}{h+(1-s)}\right) \quad (10)$$

$$s \leftarrow s \cdot (1-h) \quad (11)$$

Equation (10) corresponds to the interpolation between the original target hue and the new one, weighted according to the previous proportion of the target and the hardness of the stroke. Equation (11) reduces the proportion of the stroke's native color that will be used when rendering this point.

Figure 10:
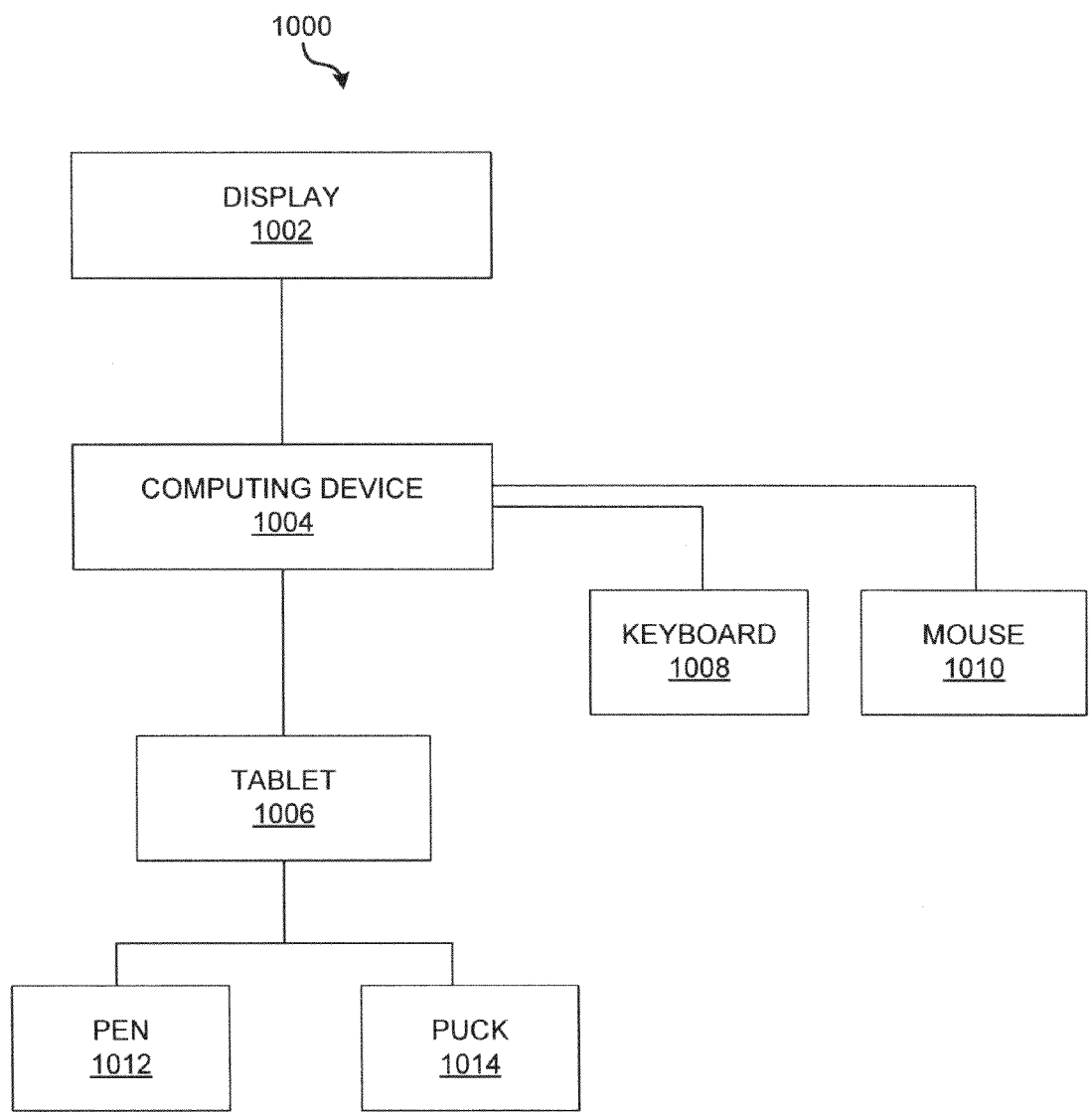
FIG. 10 illustrates a system diagram of an exemplary three-dimensional painting system.

FIG. 10 illustrates a system diagram of an exemplary three-dimensional painting system 1000. The exemplary three-dimensional painting system 1000 comprises a display 1002, a computing device 1004, and various input devices such as a keyboard 1008, a mouse 1010, a tablet 1006, a drawing pen 1012, and a puck 1014. The display 1002 may be coupled to a computing device 1004. The computing device 1004 performs 3D painting using metabrushes as described herein based upon input from the keyboard 1008 and/or the mouse 1010. Moreover, the drawing pen 1012 and/or the puck 1014 may be configured to be coupled to the tablet 1006. The computing device may be implemented as illustrated in FIG. 11.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 1100. After reading this description, it will become apparent to a person skilled in the relevant art how to implement the application using other computing modules or architectures.

Figure 11:
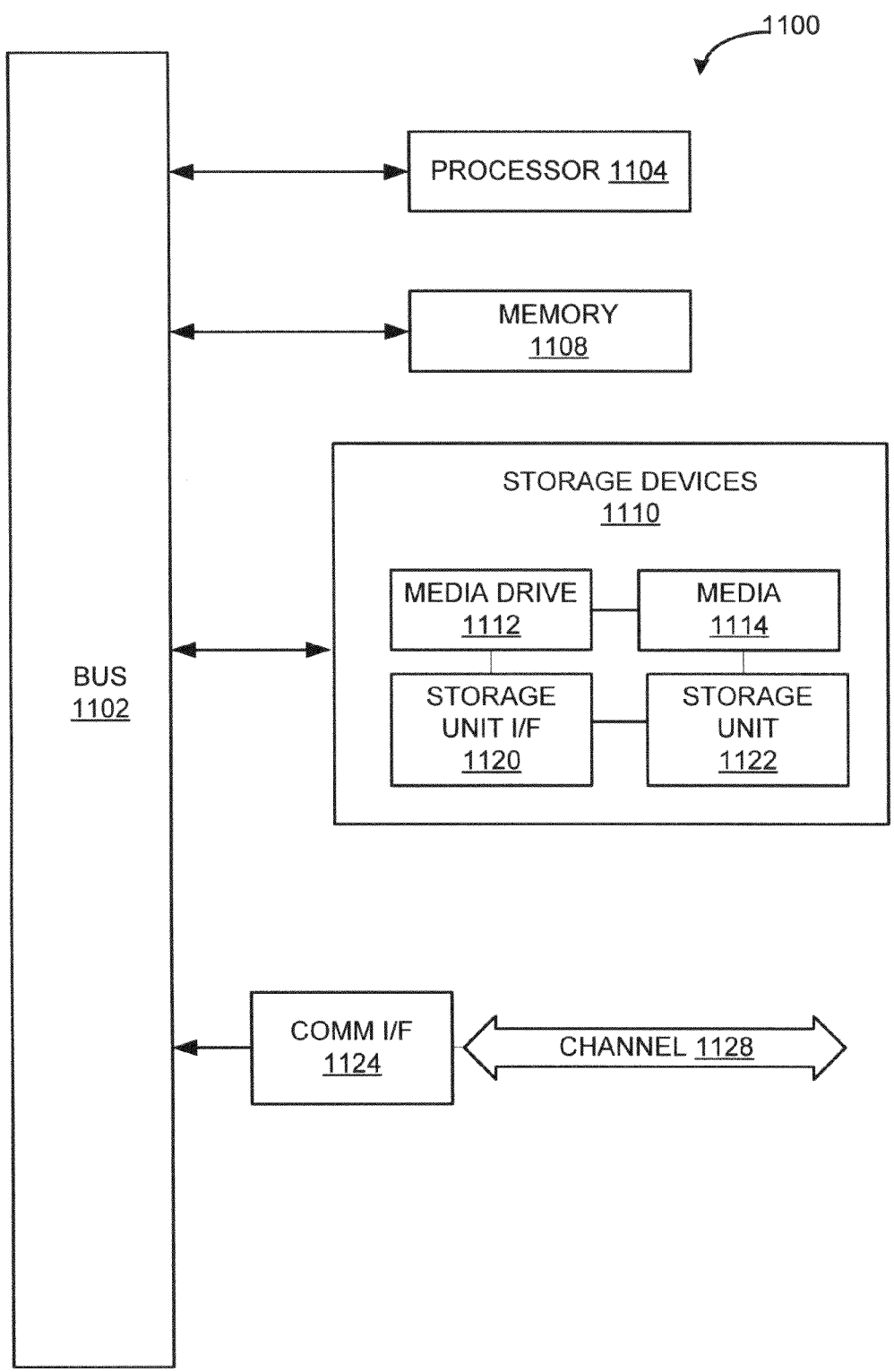
FIG. 11 illustrates an example computing module that may be used in implementing various features of embodiments of the application.

Referring now to FIG. 11, computing module 1100 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing module 1100 or to communicate externally.

Computing module 1100 might also include one or more memory modules, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, storage media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present application as discussed herein.

While various embodiments of the present application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A method of creating a digital painting, comprising:
   obtaining a metabrush comprising a plurality of constituent paint strokes;
   using the metabrush along a brush path to instantiate a metabrush instance, wherein the metabrush instance comprises the plurality of constituent paint strokes replicated along the brush path; and defining the metabrush in 3D space by an elementary geometry, wherein the plurality of constituent paint strokes are embedded on the elementary geometry.

2. The method of claim 1, further comprising computing a scale of the metabrush in world space.

3. The method of claim 1, further comprising creating a plurality of sample positions of the metabrush in world space, wherein a first sample position and a second sample position of the plurality of constituent paint strokes are adjacent and configured by a spacing parameter.

4. The method of claim 3, wherein the step of replicating the metabrush comprises:
    defining a coordinate frame on each of the plurality of sample positions;
    computing a first vector describing a painting gesture direction and a second vector normal to the painting gesture direction;
    determining an orthogonal coordinate frame by computing a cross product of the first vector and a second vector wherein the orthogonal coordinate frame is along the brush path; and
    using the orthogonal coordinate frame to replicate the metabrush.

5. The method of claim 1, wherein the step of using the metabrush comprises applying a noise model to the metabrush.

6. The method of claim 5, wherein the noise model comprises geometry jittering comprising scale jittering, diameter jittering or rotation jittering, color jittering, or opacity jittering.

7. The method of claim 1, wherein the metabrush comprises a constituent paint stroke included in a second metabrush.

8. The method of claim 1, wherein the metabrush further comprises a proxy geometry defining an object, wherein the proxy geometry is configured to be inserted into a scene.

9. The method of claim 1, further comprising defining the metabrush by using a second metabrush, wherein the metabrush is a hierarchical metabrush comprising a plurality of levels, each of the plurality of levels is configured with a pattern parameter and a noise parameter.

10. The method of claim 9, wherein the step of replicating the metabrush further comprises:
    decomposing the metabrush into the plurality of levels, each level of the plurality of levels comprising a level metabrush;
    defining a coordinate frame for a first level of the plurality of levels, wherein a level metabrush of the first level of the plurality of levels is scaled using the coordinate frame;
    creating a level metabrush of a second level of the plurality of levels by using the first level metabrush and applying the noise parameter to the first level, wherein the second level is higher than the first level.

11. The method of claim 9, wherein the noise parameter comprises a jittering between adjacent levels of the plurality of levels.

12. The method of claim 9, wherein the noise parameter is temporal and each of the plurality of levels is configured with a keyframing comprising a stroke geometry.

13. The method of claim 1, wherein the metabrush further comprises a template based on a constituent paint stroke, and the template comprises a set of sub-templates, each sub-template defined for a portion of the paint stroke.

14. The method of claim 13, wherein the template further comprises a semantic model comprising semantic information for obtaining the metabrush.

15. The method of claim 14, further comprising using a Markov model to determine the metabrush based on the template and a scene.

16. A digital painting system, comprising:
    an input device configured to receive a first set of instructions;
    a display;
    a non-transitory memory configured to store a second set of instructions and the first set of painting instructions; and
    a processor coupled to non-transitory memory and display, wherein the first set of instructions and the second set of instruction are configured to cause the processor to:
        create a metabrush comprising a plurality of constituent paint strokes;
        instantiate the metabrush by using the plurality of constituent paint strokes as a template along the brush path;
        replicate the metabrush by using the template along a brush path; and
        define the metabrush in 3D space by an elementary geometry, wherein the plurality of constituent paint strokes are embedded on the elementary geometry.

17. The digital paint system of claim 16, wherein a 3D painting is created by using the metabrush and displayed on the display.

18. An apparatus of creating a digital painting, comprising:
    a non-transitory memory configured to store a set of instructions; and
    a processor coupled to the non-transitory memory, wherein the set of instructions are configured to cause the processor to:
        create a metabrush comprising a plurality of constituent paint strokes;
        instantiate the metabrush by using the plurality of constituent paint strokes as a template along the brush path;
        replicate the metabrush by using the template along a brush path; and
        define the metabrush in 3D space by an elementary geometry, wherein the plurality of constituent paint strokes are embedded on the elementary geometry.

19. The apparatus of claim 18, wherein the set of instructions are further configured to cause the processor to:
    define the metabrush in 3D space by an elementary geometry, wherein the plurality of constituent paint strokes are embedded on the elementary geometry;
    compute a scale of the metabrush in world space; and
    create a plurality of sample positions of the metabrush in world space, wherein a first sample position and a second sample position of the plurality of constituent paint strokes are adjacent and configured by a spacing parameter.

20. The apparatus of claim 19, wherein the step of replicating the metabrush comprises:
    defining a coordinate frame on each of the plurality of sample positions;
    computing a first vector describing a painting gesture direction and a second vector normal to the painting gesture direction;
    determining an orthogonal coordinate frame by computing a cross product of the first vector and a second vector wherein the orthogonal coordinate frame is along the brush path; and
    using the orthogonal coordinate frame to replicate the metabrush.

* * * * *